United States Patent
Kim et al.

(10) Patent No.: US 12,476,236 B2
(45) Date of Patent: Nov. 18, 2025

(54) POSITIVE ELECTRODE INCLUDING POSITIVE ELECTRODE ADDITIVE, METHOD OF MANUFACTURING POSITIVE ELECTRODE, AND LITHIUM SECONDARY BATTERY INCLUDING POSITIVE ELECTRODE

(71) Applicant: LG Energy Solution, Ltd., Seoul (KR)

(72) Inventors: Gwang Yeon Kim, Daejeon (KR); Sang Seung Oh, Daejeon (KR); Hye Hyeon Kim, Daejeon (KR); Chi Ho Jo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 478 days.

(21) Appl. No.: 18/003,788

(22) PCT Filed: May 6, 2022

(86) PCT No.: PCT/KR2022/006462
§ 371 (c)(1),
(2) Date: Dec. 29, 2022

(87) PCT Pub. No.: WO2022/255667
PCT Pub. Date: Dec. 8, 2022

(65) Prior Publication Data
US 2023/0261168 A1 Aug. 17, 2023

(30) Foreign Application Priority Data
Jun. 2, 2021 (KR) .......................... 10-2021-0071225

(51) Int. Cl.
| | | |
|---|---|---|
| H01M 4/04 | (2006.01) | |
| H01M 4/131 | (2010.01) | |
| H01M 4/505 | (2010.01) | |
| H01M 4/525 | (2010.01) | |
| H01M 4/02 | (2006.01) | |

(52) U.S. Cl.
CPC ....... *H01M 4/0404* (2013.01); *H01M 4/0435* (2013.01); *H01M 4/131* (2013.01); *H01M 4/505* (2013.01); *H01M 4/525* (2013.01); H01M 2004/028 (2013.01)

(58) Field of Classification Search
CPC .......................... G01N 23/20008; B24C 1/10
See application file for complete search history.

(56) References Cited

U.S. PATENT DOCUMENTS

| | | | | |
|---|---|---|---|---|
| 4,285,435 A | * | 8/1981 | Brinkers | B65G 1/07 108/106 |
| 2007/0122701 A1 | * | 5/2007 | Yamaguchi | H01M 4/485 252/182.1 |
| 2013/0236780 A1 | | 9/2013 | Yokote et al. | |
| 2013/0244104 A1 | * | 9/2013 | Inoue | F26B 3/283 429/211 |
| 2016/0248091 A1 | * | 8/2016 | Toya | H01M 4/134 |
| 2016/0351905 A1 | | 12/2016 | Kawamura et al. | |
| 2018/0301740 A1 | | 10/2018 | Min et al. | |
| 2019/0165377 A1 | | 5/2019 | Jeon et al. | |
| 2019/0190018 A1 | * | 6/2019 | Aoki | H01M 4/366 |
| 2021/0083290 A1 | | 3/2021 | Kim et al. | |
| 2021/0265614 A1 | | 8/2021 | Lee et al. | |
| 2022/0181627 A1 | | 6/2022 | Park et al. | |

FOREIGN PATENT DOCUMENTS

| | | | | |
|---|---|---|---|---|
| CN | 110224169 A | | 9/2019 | |
| CN | 111226334 A | | 6/2020 | |
| CN | 112218829 A | | 1/2021 | |
| JP | H10064524 A | | 3/1998 | |
| JP | 2015011959 A | | 1/2015 | |
| JP | 2015138730 A | | 7/2015 | |
| JP | 2019061751 A | | 4/2019 | |
| JP | 2019160517 A | | 9/2019 | |
| KR | 101487373 B1 | | 1/2015 | |
| KR | 20170141141 A | | 12/2017 | |
| KR | 20180093709 A | | 8/2018 | |
| KR | 20190059115 A | | 5/2019 | |
| KR | 20190064423 A | | 6/2019 | |
| KR | 20190064424 A | | 6/2019 | |
| KR | 20190100078 A | | 8/2019 | |
| KR | 20200066048 A | | 6/2020 | |
| WO | 2015115052 A1 | | 8/2015 | |
| WO | WO-2015172682 A1 | * | 11/2015 | ........ H01M 10/0525 |
| WO | WO-2018172272 A1 | * | 9/2018 | ........ H01M 10/0525 |
| WO | 2018236168 A1 | | 12/2018 | |
| WO | WO-2023123024 A1 | * | 7/2023 | ............ H01M 4/622 |

OTHER PUBLICATIONS

International Search Report for PCT/KR2022/006462 mailed Aug. 26, 2022. 3 pgs.
Extended European Search Report including Written Opinion for Application No. 22816326.7 dated Apr. 9, 2025, pp. 1-6.

* cited by examiner

*Primary Examiner* — Jonathan Johnson
(74) *Attorney, Agent, or Firm* — Lerner David LLP

(57) ABSTRACT

Provided are a positive electrode including a positive electrode additive, a method of manufacturing the positive electrode, and a lithium secondary battery including the positive electrode. A coating temperature of a slurry is adjusted when the positive electrode is manufactured, and thus the deformation of the positive electrode additive due to temperature is minimized, and accordingly, structural deformation of the positive electrode additive included in the positive electrode is prevented.

14 Claims, No Drawings

POSITIVE ELECTRODE INCLUDING POSITIVE ELECTRODE ADDITIVE, METHOD OF MANUFACTURING POSITIVE ELECTRODE, AND LITHIUM SECONDARY BATTERY INCLUDING POSITIVE ELECTRODE

CROSS-REFERENCE TO RELATED APPLICATIONS

This application is a national phase entry under 35 USC § 371 of International Appl. No. PCT/KR2022/006462, filed May 6, 2022, which claims priority from Korean Patent Application No. 10-2021-0071225, filed on Jun. 2, 2021, the entire contents of both being incorporated herein by reference.

TECHNICAL FIELD

The present disclosure relates to a positive electrode including a positive electrode additive, in which deformation due to temperature is minimized by adjusting a coating temperature of a slurry when the positive electrode is manufactured, a method of manufacturing the positive electrode, and a lithium secondary battery including the positive electrode.

BACKGROUND ART

Recently, the demand for secondary batteries serving as energy sources is rapidly increasing. Among these secondary batteries, lithium secondary batteries having a high energy density and voltage, a long cycle life, and a low self-discharge rate have been commercialized and widely used.

Graphite is mainly used as a negative electrode material of a lithium secondary battery, but since graphite has a small capacity per unit mass of 372 mAh/g, it is difficult to increase the capacity of the lithium secondary battery. Accordingly, in order to increase the capacity of the lithium secondary battery, negative electrode materials that form an intermetallic compound with lithium, such as silicon, tin, and oxides thereof, are being developed and used as a non-carbon-based negative electrode material having a higher energy density than graphite. However, in the case of such a non-carbon-based negative electrode material, there exists a problem that although the capacity is large, the initial efficiency is low, the lithium consumption during the initial charging and discharging is large, and the irreversible capacity loss is large.

In this regard, a method has been proposed to provide a lithium ion source or storage for a positive electrode material and overcome the irreversible capacity loss of a negative electrode by using a material that is electrochemically active after a first cycle so as not to degrade the overall performance of the battery. Specifically, a method of applying an oxide containing an excess of lithium, such as $Li_6CoO_4$, serving as a sacrificial positive electrode material or an irreversible additive (or an overdischarge inhibitor), to a positive electrode is known.

Meanwhile, conventional positive electrode additives such as $Li_6CoO_4$ and the like show excellent charging/discharging characteristics and lifetime characteristics, but have a problem of low thermal stability. Specifically, the positive electrode additive may cause problems such as degradation of battery characteristics due to structural deformation under the influence of temperature, for example, a temperature of a slurry, when a mixture layer of the positive electrode is manufactured.

Therefore, there is a need for technological development capable of preventing the structural deformation of a positive electrode additive even when the positive electrode additive is used in manufacture of a positive electrode.

DOCUMENT OF RELATED ART

Patent Document

Japanese Laid-open Patent Publication No. 2019-061751

Technical Problem

An object of the present disclosure is to provide a positive electrode including a positive electrode additive, in which deformation due to temperature is minimized by adjusting a coating temperature of a slurry when the positive electrode is manufactured, a method of manufacturing the positive electrode, and a lithium secondary battery including the positive electrode.

Technical Solution

The present disclosure is directed to solving the above-described problem and providing a method of manufacturing a positive electrode for a lithium secondary battery, including applying a first slurry containing a positive electrode active material, a positive electrode additive, a conductive material, and a binder on at least one surface of a current collector and forming a first mixture layer, and applying a second slurry containing a positive electrode active material, a conductive material, and a binder on the current collector on which the first mixture layer is formed and forming a second mixture layer, wherein the forming of the first mixture layer and the forming of the second mixture layer include a process of controlling a temperature of the first slurry to 40° C. or less and a process of controlling a temperature of the second slurry to 40° C. or less, respectively, and wherein Expression 1 below is satisfied when X-ray diffraction (XRD) analysis is performed on the first mixture layer:

$$A/B \leq 1 \qquad \text{[Expression 1]}$$

wherein A represents an intensity of a strongest peak among peaks appearing in a range of $2\theta=38.5\pm0.1°$, and B represents an intensity of a strongest peak among peaks appearing in a range of $2\theta=47.9\pm0.1°$.

The forming of the first mixture layer and the forming of the second mixture layer may include a process of controlling a temperature of the first slurry to be in a range of 10° C. to 40° C. and a process of controlling a temperature of the second slurry to be in a range of 10° C. to 40° C., respectively.

The method may further include a first rolling operation of rolling the first mixture layer after the forming of the first mixture layer, and a second rolling operation of rolling the second mixture layer after the forming of the second mixture layer.

The first rolling operation may be performed at a speed of 0.5 m/s to 6 m/s, the second rolling operation may be performed at a speed of 2 m/s to 7 m/s, and the second rolling operation may be performed at a greater speed than the first rolling operation. In this case, the first rolling operation may be performed at a temperature of 10° C. to 40° C., and the second rolling operation may be performed at a temperature of 40° C. to 100° C.

The present disclosure is also directed to providing a positive electrode for a lithium secondary battery, including a current collector and a mixture layer formed on at least one surface of the current collector, wherein the mixture layer has a two-layer structure in which a first mixture layer and a second mixture layer are laminated, wherein the first mixture layer includes a positive electrode active material, a conductive material, a positive electrode additive, and a binder, and wherein Expression 1 below is satisfied when XRD analysis is performed on the first mixture layer:

$$A/B \leq 1 \quad \text{[Expression 1]}$$

wherein A represents an intensity of a strongest peak among peaks appearing in a range of 2θ=38.5±0.1°, and B represents an intensity of a strongest peak among peaks appearing in a range of 2θ=47.9±0.1°.

The positive electrode additive may be a lithium cobalt oxide represented by Chemical Formula 1 below:

$$Li_pCo_{(1-q)}M^1{}_qO_4 \quad \text{[Chemical Formula 1]}$$

wherein in Chemical Formula 1 above, $M^1$ denotes one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are 5≤p≤7 and 0≤q≤0.5, respectively.

In Chemical Formula 1 above, $M^1$ may denote a Zn element, and q may be 0.2≤q≤0.4.

The positive electrode additive may have a tetragonal structure with a space group of $P4_2/nmc$.

The content of the positive electrode additive may range from 0.1 to 5 wt % with respect to a total weight of the first mixture layer.

The positive electrode active material may be a lithium nickel composite oxide represented by Chemical Formula 2 below:

$$Li_x[Ni_yCo_zMn_wM^2{}_v]O_u \quad \text{[Chemical Formula 2]}$$

wherein in Chemical Formula 2 above, $M^2$ denotes one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w, v, and u are 1.0≤x≤1.30, 0.1≤y<0.95, 0.01<z≤0.5, 0.01<w≤0.5, 0≤v≤0.2, 1.5≤u≤4.5, respectively.

An average thickness (D1) of the first mixture layer may range from 0.1 μm to 20 μm, and an average thickness (D2) of the second mixture layer may range from 50 μm to 300 μm.

The present disclosure is also directed to providing a lithium secondary battery including the positive electrode according to the present disclosure described above, a negative electrode, and a separator interposed between the positive electrode and the negative electrode.

The negative electrode may include a negative electrode current collector and a negative electrode mixture layer positioned on the negative electrode current collector and including a negative electrode active material, wherein the negative electrode active material may include a carbon material and a silicon material.

The silicon material may be included in an amount of 1 to 20 parts by weight with respect to 100 parts by weight of the negative electrode mixture layer.

Advantageous Effects

According to a positive electrode including the positive electrode additive according to the present disclosure, a method of manufacturing the positive electrode, and a lithium secondary battery including the positive electrode, by adjusting a coating temperature of a slurry when the positive electrode is manufactured, the deformation of the positive electrode additive due to temperature can be minimized, and accordingly, structural deformation of a positive electrode additive included in the positive electrode can be prevented.

DETAILED DESCRIPTION

While the present invention may have various modifications and alternative forms, specific embodiments thereof will be described in detail.

However, it should be understood that there is no intent to limit the present invention to the particular forms disclosed, and on the contrary, the present invention is to cover all modifications, equivalents, and alternatives falling within the spirit and scope of the present invention.

It should be further understood that the terms "comprise," "comprising," "include," and/or "including," when used herein, specify the presence of stated features, integers, steps, operations, components, parts, or combinations thereof, but do not preclude the presence or addition of one or more other features, integers, steps, operations, components, parts, or combinations thereof.

In addition, when a layer, film, region, or plate is referred to as being "formed on" another layer, film, region, or plate, it includes a case in which the layer, film, region, or plate is formed directly on another layer, film, region, or plate and a case in which still another layer, film, region, or plate is interposed between the layer, film, region, or plate and another layer, film, region, or plate. In contrast, when a layer, film, region, or plate is referred to as being "formed below" another layer, film, region, or plate, it includes a case in which the layer, film, region, or plate is formed directly below another layer, film, region, or plate and a case in which still another layer, film, region, or plate is interposed between the layer, film, region, or plate and another layer, film, region, or plate. Further, in this specification, when a component is referred to as being disposed "on" another component, it includes a case in which a component is disposed above another component and a case in which a component is disposed below another component.

Hereinafter, the present invention will be described in more detail.

Positive Electrode

In an embodiment, the present disclosure provides a positive electrode for a lithium secondary battery, which includes a current collector and a mixture layer formed on at least one surface (i.e. on one surface or on both surfaces) of the current collector, wherein the mixture layer has a two-layer structure in which a first mixture layer and a second mixture layer are laminated, wherein the first mixture layer includes a positive electrode active material, a conductive material, a positive electrode additive, and a binder, and wherein Expression 1 below is satisfied when X-ray diffraction (XRD) analysis is performed on the first mixture layer:

$$A/B \leq 1 \quad \text{[Expression 1]}$$

wherein A represents an intensity of a strongest peak among peaks appearing in a range of 2θ=38.5±0.1°, and B represents an intensity of a strongest peak among peaks appearing in a range of 2θ=47.9±0.1°.

The positive electrode for a lithium secondary battery according to the present disclosure has a two-layer structure in which the first mixture layer and the second mixture layer are sequentially laminated on the current collector so that the second mixture layer is positioned at an outermost side.

In this case, the first mixture layer may include a positive electrode active material, a conductive material, a positive electrode additive, and a binder, wherein the positive electrode additive may be a lithium cobalt oxide represented by Chemical Formula 1 below:

$$Li_pCo_{(1-q)}M^1{}_qO_4 \quad \text{[Chemical Formula 1]}$$

wherein in Chemical Formula 1 above, $M^1$ denotes one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are $5 \le p \le 7$ and $0 \le q \le 0.5$, respectively.

Specifically, in Chemical Formula 1 above, $M^1$ may denote a Zn element, and q may be $0.2 \le q \le 0.4$.

The positive electrode additive may contain lithium in excess to provide lithium for lithium consumption caused by an irreversible chemical and physical reaction at a negative electrode during initial charging, and accordingly, the charging capacity of the battery may be increased and the irreversible capacity of the battery may be reduced, resulting in an improvement in lifetime characteristics of the battery.

The present disclosure may include the lithium cobalt oxide represented by Chemical Formula 1 as the positive electrode additive, and in this case, $Li_6CoO_4$, $Li_6Co_{0.5}Zn_{0.5}O_4$, $Li_6Co_{0.7}Zn_{0.3}O_4$, and the like may be used alone or in combination as the lithium cobalt oxide represented by Chemical Formula 1. The lithium cobalt oxide represented by Chemical Formula 1 above has an advantage in that an amount of lithium ions is higher than that of nickel-containing oxide commonly used in the art, and a voltage range required for delithiation is low, and thus the lithium ions may be deintercalated without affecting a reaction of the positive electrode active material when the battery is activated.

Further, the lithium cobalt metal oxide represented by Chemical Formula 1 above may have a tetragonal crystal structure and may have a space group of $P4_2/nmc$ among the tetragonal crystal structures. The lithium cobalt metal oxide represented by Chemical Formula 1 above exhibits excellent charging/discharging characteristics and lifetime characteristics in the lithium secondary battery, but has a low thermal stability. Specifically, when the lithium cobalt metal oxide represented by Chemical Formula 1 above is used as a positive electrode additive, structural deformation may occur under the influence of a temperature, for example, a temperature of a slurry, when the mixture layer of the positive electrode is manufactured, and thus the characteristics of the battery may be degraded.

Meanwhile, in the positive electrode for a lithium secondary battery according to the present disclosure, the deformation of the positive electrode additive due to temperature is minimized by adjusting a coating temperature of the slurry when the positive electrode is manufactured.

As an example, the positive electrode for a lithium secondary battery according to the present disclosure may satisfy Expression 1 above when XRD analysis is performed on the first mixture layer.

In Expression 1 above, the peak appearing in the range of $2\theta=47.9\pm0.1°$ and having intensity B is implemented by crystals of the lithium cobalt metal oxide represented by Chemical Formula 1, and the peak appearing in the range of $2\theta=38.5\pm0.1°$ and having intensity A is implemented by impurities. It means that a fraction of the lithium cobalt metal oxide represented by Chemical Formula 1 increases as an intensity ratio of the peaks, that is, "A/B," decreases. In the positive electrode according to the present disclosure, in the positive electrode additive included in the first mixture layer, the fraction of the lithium cobalt metal oxide represented by Chemical Formula 1 is improved to 98% or more, and thus A/B may be 1 or less, 0.35 or less, 0.25 or less, or 0.1 or less. In some cases, A/B may be 0 because the lithium cobalt metal oxide represented by Chemical Formula 1 accounts for 100% of the positive electrode additive.

In addition, the content of the positive electrode additive may range from 0.1 to 5 parts by weight with respect to 100 parts by weight of the total amount of the first mixture layer, and specifically, may range from 0.1 to 3 parts by weight, or 1 to 3 parts by weight.

The first mixture layer is a positive electrode active material capable of reversible intercalation and deintercalation, and may include a lithium nickel composite oxide represented by Chemical Formula 2:

$$Li_x[Ni_yCo_zMn_wM^2{}_v]O_u \quad \text{[Chemical Formula 2]}$$

wherein in Chemical Formula 2 above, $M^2$ denotes one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w, v, and u are $1.0 \le x \le 1.30$, $0.1 \le y < 0.95$, $0.01 < z \le 0.5$, $0.01 < w \le 0.5$, $0 \le v \le 0.2$, $1.5 \le u \le 4.5$, respectively.

The lithium nickel composite oxide represented by Chemical Formula 2 is a composite metal oxide containing lithium, nickel, cobalt, and manganese, and in some cases, may have a form in which another transition metal $M^2$ is doped. For example, the positive electrode active material may include one or more compounds selected from the group consisting of $LiNi_{1/3}Co_{1/3}Mn_{1/3}O_2$, $LiNi_{0.6}Co_{0.2}Mn_{0.2}O_2$, $LiNi_{0.8}Co_{0.1}Mn_{0.1}O_2$, $LiNi_{0.9}Co_{0.05}Mn_{0.05}O_2$, $LiNi_{0.8}Co_{0.1}Mn_{0.05}Al_{0.05}O_2$ and $LiNi_{0.7}Co_{0.1}Mn_{0.1}Al_{0.1}O_2$, As an example, in the positive electrode active material, $LiNi_{0.6}Co_{0.2}Mn_{0.2}O_2$ and $LiNi_{0.8}Co_{0.1}Mn_{0.1}O_2$ may be used alone or in combination as the lithium nickel composite metal oxide represented by Chemical Formula 2.

Further, the content of the positive electrode active material may range from 85 to 95 parts by weight with respect to 100 parts by weight of the positive electrode mixture layer, and specifically, may range from 88 to 95 parts by weight, 90 to 95 parts by weight, 86 to 90 parts by weight, or 92 to 95 parts by weight.

In this case, the conductive material may be used to improve the performance of the positive electrode, such as electrical conductivity or the like, and the conductive material may include one or more materials selected from the group consisting of natural graphite, artificial graphite, carbon black, acetylene black, Ketjen black, and carbon fibers. For example, the conductive material may include acetylene black.

Further, the conductive material may be included in an amount of 1 to 10 parts by weight with respect to 100 parts by weight of the first mixture layer, and specifically, may be included in an amount of 2 to 8 parts by weight, or 2 to 6 parts by weight.

In addition, the binder may include one or more resins selected from the group consisting of a polyvinylidene fluoride-hexafluoropropylene copolymer (PVDF-co-HFP), polyvinylidene fluoride, polyacrylonitrile, polymethylmethacrylate, and copolymers thereof. As an example, the binder may include polyvinylidene fluoride.

Further, the binder may be included in an amount of 1 to 10 parts by weight with respect to 100 parts by weight of the total amount of the first mixture layer, and specifically, may be included in an amount of 2 to 8 parts by weight, or 2 to 6 parts by weight.

In addition, an average thickness of the first mixture layer is not particularly limited, but may specifically range from 0.1 µm to 20 µm, and more specifically, may range from 0.1 µm to 15 µm, 0.1 µm to 10 µm, 2 µm to 10 µm, 4 µm to 10 µm, or 5 µm to 9 µm.

In addition, the second mixture layer may include a positive electrode active material, a conductive material, and a binder.

The positive electrode active material included in the second mixture layer may be applied without particular limitation as long as it is a lithium metal composite oxide represented by Chemical Formula 2, and examples of the positive electrode active material may include one or more compounds selected from the group consisting of $LiNi_{1/3}Co_{1/3}Mn_{1/3}O_2$, $LiNi_{0.6}Co_{0.2}Mn_{0.2}O_2$, $LiNi_{0.8}Co_{0.1}Mn_{0.1}O_2$, $LiNi_{0.9}Co_{0.05}Mn_{0.05}O_2$, $LiNi_{0.8}Co_{0.1}Mn_{0.05}Al_{0.05}O_2$, and $LiNi_{0.7}Co_{0.1}Mn_{0.1}Al_{0.1}O_2$.

As an example, in the positive electrode active material, $LiNi_{0.6}Co_{0.2}Mn_{0.2}O_2$ and $LiNi_{0.8}Co_{0.1}Mn_{0.1}O_2$ may be used alone or in combination as the lithium nickel composite metal oxide represented by Chemical Formula 2.

Further, the content of the positive electrode active material may range from 80 to 98 parts by weight with respect to 100 parts by weight of the second mixture layer, and specifically, may range from 84 to 96 parts by weight, or 88 to 96 parts by weight.

In this case, the conductive material included in the second mixture layer may be used to improve the performance of the positive electrode, such as electrical conductivity or the like, and the conductive material may include one or more materials selected from the group consisting of natural graphite, artificial graphite, carbon black, acetylene black, Ketjen black, and carbon fibers. For example, the conductive material may include acetylene black.

In addition, the conductive material may be included in an amount of 1 to 10 parts by weight with respect to 100 parts by weight of the second mixture layer, and specifically, may be included in an amount of 2 to 8 parts by weight, or 2 to 6 parts by weight.

Further, the binder included in the second mixture layer may include one or more resins elected from the group consisting of a polyvinylidene fluoride-hexafluoropropylene copolymer (PVDF-co-HFP), polyvinylidene fluoride, polyacrylonitrile, polymethylmethacrylate, and copolymers thereof. As an example, the binder may include polyvinylidene fluoride.

Further, the binder may be included in an amount of 1 to 10 parts by weight with respect to 100 parts by weight of the second mixture layer, and specifically, may be included in an amount of 2 to 8 parts by weight, or 2 to 6 parts by weight.

In addition, an average thickness of the second mixture layer may range from 50 µm to 300 µm, and specifically, may range from 100 µm to 200 µm, 80 µm to 150 µm, 120 µm to 170 µm, 150 µm to 300 µm, 200 µm to 300 µm, or 150 µm to 190 µm.

In a specific example, a thickness of the second mixture layer may be greater than a thickness of the first mixture layer.

Meanwhile, in the positive electrode for a lithium secondary battery according to the present disclosure, a material having high conductivity without causing a chemical change in the battery may be used in the current collector. For example, stainless steel, aluminum, nickel, titanium, calcined carbon, or the like may be used, and when aluminum or stainless steel is used, a material surface-treated with carbon, nickel, titanium, silver, or the like may be used. Further, the current collector may have fine irregularities formed on a surface thereof to increase an adhesive force of the positive electrode active material, and may be formed in various forms such as a film, a sheet, a foil, a net, a porous body, a foam body, a nonwoven body, and the like. In addition, an average thickness of the positive electrode current collector may be appropriately applied in a range of 3 to 500 µm in consideration of the conductivity and total thickness of the positive electrode to be manufactured.

Method of Manufacturing Positive Electrode

Further, in an embodiment, the present disclosure provides a method of manufacturing a positive electrode for a lithium secondary battery, which includes applying a first slurry containing a positive electrode active material, a positive electrode additive, a conductive material, and a binder on at least one surface (i.e. one surface or both surfaces) of a current collector and forming a first mixture layer, and applying a second slurry containing a positive electrode active material, a conductive material, and a binder on the current collector on which the first mixture layer is formed and forming a second mixture layer, wherein the forming of the first mixture layer includes a process of controlling a temperature of the first slurry to 40° C. or less, wherein the forming of the second mixture layer includes a process of controlling a temperature of the second slurry to 40° C. or less, and wherein Expression 1 below is satisfied when XRD analysis is performed on the first mixture layer:

$$A/B \le 1 \quad \text{[Expression 1]}$$

wherein A represents an intensity of a strongest peak among peaks appearing in a range of $2\theta=38.5\pm0.1°$, and B represents an intensity of a strongest peak among peaks appearing in a range of $2\theta=47.9\pm0.1°$.

In the method of manufacturing the positive electrode for a lithium secondary battery according to the present disclosure, the first mixture layer and the second mixture layer are sequentially formed on the current collector so that the second mixture layer is positioned at an outermost side, wherein, in the process of forming the first mixture layer, the deformation of the positive electrode additive included in the first mixture layer may be minimized by controlling the temperature of the first slurry. Accordingly, it is possible to prevent structural deformation of the positive electrode additive included in the positive electrode, thereby preventing degradation of battery characteristics.

Here, controlling the temperature of the slurry may mean controlling an ambient temperature when the slurry is applied on the current collector, and specifically, may mean controlling a temperature of an inside of a reactor in which the slurry is stored when the slurry is applied on the current collector.

As an example, the forming of the first mixture layer and the forming of the second mixture layer are each performed at a temperature of 10° C. to 40° C. Specifically, in the forming of the first mixture layer, when the first slurry is applied on the current collector, the temperature of the reactor in which the first slurry is stored may be controlled to be in a range of 10° C. to 40° C., and more specifically, may be controlled to be in a range of 10° C. to 30° C., 10° C. to 20° C., 15° C. to 25° C., 22° C. to 28° C., 20° C. to 30° C., or 18° C. to 25° C. In the forming of the first mixture layer and the forming of the second mixture layer, when the temperature of either the first or second slurry is controlled to be less than 10° C., such slurry may not be uniformly applied on the current collector, and when the temperature of either the first or second slurry is controlled to exceed 40° C., the deformation of the positive electrode additive contained in the first slurry may occur. Therefore, in the forming of the first mixture layer and the forming of the second mixture layer, the temperature of the first slurry and the temperature of the second slurry may be controlled within the above-described ranges, respectively.

Furthermore, the method of manufacturing the positive electrode for a lithium secondary battery according to the present disclosure may include a first rolling operation of rolling the first mixture layer after the forming of the first mixture layer, and a second rolling operation of rolling the second mixture layer after the forming of the second mixture layer. In a specific example, in the method of manufacturing the positive electrode for a lithium secondary battery according to the present disclosure, two rolling processes including a rolling process performed on the first mixture layer using a roll press before the forming of the second mixture layer and a rolling process performed on the second mixture layer after the forming of the second mixture layer may be performed.

Here, the first rolling operation may make a thickness of the first mixture layer uniform, and the temperature may be controlled when the rolling is performed, and thus the deformation of the positive electrode additive may be minimized. To this end, the first rolling operation may be performed at a lower temperature and, may be performed at a lower speed as compared to the second rolling operation. Specifically, the first rolling operation may be performed at a temperature of 10° C. to 40° C., 10° C. to 30° C., 10° C. to 20° C., 15° C. to 25° C., 22° C. to 28° C., 20° C. to 30° C., or 18° C. to 25° C. similar to when controlling the temperature of the slurry when forming the mixture layer described above. Further, the first rolling operation may be performed at a rolling speed of 0.5 m/s to 6 m/s, and specifically, may be performed at a rolling speed of 0.5 m/s to 5.5 m/s, 0.5 m/s to 5 m/s, 0.5 m/s to 4.5 m/s, 0.5 m/s to 4 m/s, 0.5 m/s to 3.5 m/s, 0.7 m/s to 3 m/s, 0.7 m/s to 2.5 m/s, 0.7 m/s to 2 m/s, 0.9 m/s to 2 m/s, 1 m/s to 1.5 m/s, 1 m/s to 1.2 m/s, 2 m/s to 5 m/s, 2 m/s to 5.5 m/s, or 3 m/s to 5 m/s.

Further, the second rolling operation may be performed at a relatively high temperature and high speed as compared to the first rolling operation. Specifically, the second rolling operation may be performed at a temperature of 50° C. to 100° C., and more specifically, may be performed at a temperature of 60° C. to 100° C., 75° C. to 100° C., 85° C. to 100° C., 50° C. to 90° C., 60° C. to 80° C., or 65° C. to 90° C. Specifically, the second rolling operation may be performed at a rolling speed of 2 m/s to 7 m/s, and more specifically, may be performed at a rolling speed of 2 m/s to 6.5 m/s, 2 m/s to 6 m/s, 2 m/s to 5.5 m/s, 2 m/s to 5 m/s, 2 m/s to 4.5 m/s, 2 m/s to 4 m/s, 2.5 m/s to 4 m/s, 2.5 m/s to 3.5 m/s, 3.5 m/s to 5 m/s, 5 m/s to 7 m/s, 5.5 m/s to 6.5 m/s, or 6 m/s to 7 m/s.

In addition, each of the first rolling operation and the second rolling operation may be performed under a pressure condition of 50 MPa to 200 MPa, and specifically, may be performed under a pressure condition of 50 MPa to 150 MPa, 50 MPa to 100 MPa, 100 MPa to 200 MPa, 150 MPa to 200 MPa, or 80 MPa to 140 MPa. In this case, in order to optimize a rolling density of the first mixture layer, the first rolling operation may be performed under the same pressure condition as in the second rolling operation, or may be performed under a pressure condition as high as 2 times or less the pressure in the second rolling operation, for example, as high as 1.5 times or less, 1.2 times or less, or 1.1 times to 1.4 times the pressure in the second rolling operation. Accordingly, a ratio (D1:D2) of an average thickness D1 of the first mixture layer and an average thickness D2 of the second mixture layer may range from 4:6 to 1:10. Specifically, the ratio (D1:D2) of the average thicknesses of the first and second positive electrode mixture layers may range from 3:7 to 1:10 or 2:8 to 1:9. In the present disclosure, the second mixture layer is formed to be relatively thick, thereby increasing a bonding force with the current collector and increasing the stability of the electrode.

According to the present disclosure, the first mixture layer and the second mixture layer may be sequentially formed on the current collector under the same temperature and rolling conditions as described above, and thus a positive electrode containing a positive electrode additive with minimal deformation may be manufactured.

Accordingly, the positive electrode which is manufactured according to the method of manufacturing the positive electrode for a lithium secondary battery according to the present disclosure may satisfy Expression 1 above when the XRD analysis is performed on the first mixture layer.

Lithium Secondary Battery

Further, in an embodiment, the present disclosure provides a lithium secondary battery including the positive electrode according to the present disclosure described above, a negative electrode, and a separator interposed between the positive electrode and the negative electrode.

The lithium secondary battery according to the present disclosure may include the positive electrode of the present disclosure described above and the negative electrode and have a structure in which the positive electrode and the negative electrode are impregnated with a lithium salt-containing electrolyte.

Here, the negative electrode may include a negative electrode current collector, and a negative electrode mixture layer positioned on the negative electrode current collector and containing a negative electrode active material. Specifically, the negative electrode may be manufactured by applying, drying, and pressing the negative electrode active material on the negative electrode current collector, and the conductive material as described above, and an organic binder polymer, a filler, and the like may be optionally further included as necessary.

Further, examples of the negative electrode active material may include carbon and graphite materials, such as graphite with a completely layered crystal structure like natural graphite, soft carbon having a low crystallinity layered crystal structure (graphene structure; a structure in which hexagonal honeycomb planes of carbon are arranged in layers), hard carbon in which these structures are mixed with amorphous parts, artificial graphite, expanded graphite, carbon fibers, non-graphitizable carbon, carbon black, carbon nanotubes, fullerenes, activated carbon, and the like, metal complex oxides, such as $Li_xFe_2O_3(0 \leq x \leq 1)$, $Li_xWO_2$ $(0 \leq x \leq 1)$, $Sn_xMe_{1-x}Me'_yO_z$ (Me: Mn, Fe, Pb, Ge; Me': Al, B, P, Si, Groups 1, 2 and 3 elements of the periodic table, halogens; $0 < x \leq 1$; $1 \leq y \leq 3$; $1 \leq z \leq 8$), and the like, lithium metal, a lithium alloy, a silicon-based alloy, a tin-based alloy, metal oxides, such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$, and the like, conductive polymers, such as polyacetylene and the like, Li—Co—Ni-based materials, titanium oxide, lithium titanium oxide, and the like.

As an example, the negative electrode active material may include graphite and silicon (Si)-containing particles, the graphite may include one or more of natural graphite having a layered crystal structure and artificial graphite having an isotropic structure, and the silicon (Si)-containing particles are particles containing silicon (Si) serving as a metal component as a main component, and may include silicon (Si) particles, silicon dioxide ($SiO_2$) particles, or a mixture of silicon (Si) particles and silicon dioxide ($SiO_2$) particles.

In this case, the negative electrode active material may include 80 to 95 parts by weight of graphite and 1 to 20 parts by weight of silicon (Si)-containing particles with respect to a total of 100 parts by weight. In the present technology, by adjusting the amounts of the graphite and the silicon (Si)-containing particles included in the negative electrode active material within the above range, the charging capacity per unit mass may be improved while reducing lithium consumption and irreversible capacity loss during initial charging and discharging of the battery.

Further, the negative electrode mixture layer may have an average thickness of 100 μm to 200 μm, and specifically, may have an average thickness of 100 μm to 180 μm, 100 μm to 150 μm, 120 μm to 200 μm, 140 μm to 200 μm, or 140 μm to 160 μm.

In addition, the negative electrode current collector is not particularly limited to any current collector as long as it has high conductivity without causing a chemical change in the battery, and for example, a copper, stainless steel, nickel, titanium, calcined carbon, or the like may be used, and when copper or stainless steel is used, a material surface-treated with carbon, nickel, titanium, silver, or the like may be used.

Further, the negative electrode current collector, like the positive electrode current collector, may have fine irregularities formed on a surface thereof to strengthen a bonding force with the negative electrode active material, and may be formed in various forms such as a film, a sheet, a foil, a net, a porous body, a foam body, a nonwoven body, and the like. In addition, an average thickness of the negative electrode current collector may be appropriately applied in a range of 3 to 500 μm in consideration of the conductivity and total thickness of a negative electrode to be manufactured.

Further, the separator is interposed between the positive electrode and the negative electrode, and an insulating thin film having high ion permeability and mechanical strength is used. The separator is not particularly limited as long as it is commonly used in the art, and specifically, a sheet or non-woven fabric made of chemical-resistant and hydrophobic polypropylene, glass fiber, polyethylene, or the like may be used, and in some cases, a composite separator in which a porous polymer base material such as a sheet or nonwoven fabric is coated with inorganic particles/organic particles by an organic binder polymer may be used. When a solid electrolyte such as a polymer or the like is used as an electrolyte, the solid electrolyte may also serve as a separator. In addition, pores of the separator may have an average diameter of 0.01 to 10 μm and an average thickness of 5 to 300 μm.

Meanwhile, the positive electrode and the negative electrode may be wound in the form of a jelly roll, and accommodated in a cylindrical battery, a prismatic battery, or a pouch-type battery or accommodated in a pouch-type battery in a folding or stack-and-folding form, but the present disclosure is not limited thereto.

Further, a lithium salt-containing electrolyte according to the present disclosure may consist of an electrolyte and a lithium salt, and examples of the lithium salt-containing electrolyte may include a non-aqueous organic solvent, an organic solid electrolyte, an inorganic solid electrolyte, and the like.

Examples of the non-aqueous organic solvent may include an aprotic organic solvent such as N-methyl-2-pyrrolidinone, ethylene carbonate, propylene carbonate, butylene carbonate, dimethyl carbonate, diethyl carbonate, gamma-butyrolactone, 1,2-dime ethoxyethane, tetrahydroxy franc, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

Examples of the organic solid electrolyte may include polyethylene derivatives, polyethylene oxide derivatives, polypropylene oxide derivatives, phosphoric acid ester polymers, poly agitation lysine, polyester sulfide, polyvinyl alcohol, polyvinylidene fluoride, polymeric materials containing ionic dissociation groups, etc.

Examples of the inorganic solid electrolyte may include nitrides, halides, sulfates, etc. of Li such as $Li_3N$, $LiI$, $Li_5Ni_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, or the like.

The lithium salt is a material that is easily soluble in a non-aqueous electrolyte, and examples of the lithium salt may include $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lithium lower aliphatic carboxylates, lithium 4-phenylboronate, imide, etc.

Further, for the purpose of improving charging and discharging characteristics, flame retardancy, etc., pyridine, triethylphosphite, triethanolamine, cyclic ether, ethylene diamine, n-glyme, hexaphosphoric acid triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, etc. may be added to the electrolyte. In some cases, in order to impart incombustibility, a halogen-containing solvent such as carbon tetrachloride, ethylene trifluoride, etc. may be further included, and in order to improve high-temperature storage characteristics, carbon dioxide gas may be further included and fluoroethylene carbonate (FEC), propene sultone (PRS), etc. may be further included.

Meanwhile, in an embodiment, the present disclosure provides a battery module including the above-described secondary battery as a unit battery, and provides a battery pack including the battery module.

The battery pack may be used as a power source for medium-to-large devices that require high-temperature stability, long cycle characteristics, and high rate characteristics, and specific examples of the medium-to-large devices may include power tools powered by an electric motor, electric vehicles including electric vehicles (EVs), hybrid electric vehicles (HEVs), plug-in hybrid electric vehicles (PHEVs), and the like, electric two-wheeled vehicles including electric bicycles (E-bikes) and electric scooters (E-scooters), electric golf carts, power storage systems, etc., and more specifically, may include HEVs, but the present disclosure is not limited thereto.

Mode for Implementation of the Invention

Hereinafter, the present invention will be described in more detail with reference to examples and comparative examples.

However, the examples and comparative examples described below are merely intended to illustrate the present invention, and the content of the present invention is not limited to the examples and comparative examples described below.

Examples 1 to 4 and Comparative Examples 1 to 7.
Manufacture of Positive Electrode for Lithium Secondary Battery 95 parts by weight of $LiNi_{0.8}Co_{0.1}Mn_{0.1}O_2$ as a positive electrode active material, 0.9 parts by weight of $Li_6CoO_4$ as a positive electrode additive, 1.6 parts by weight of PVdF as a binder, and 2.5 parts by weight of carbon black as a conductive material were weighed and mixed in an N-methylpyrrolidone (NMP) solvent to prepare a first slurry for a first mixture layer.

Separately, 95 parts by weight of $LiNi_{0.8}Co_{0.1}Mn_{0.1}O_2$ as a positive electrode active material, 2 parts by weight of PVdF as a binder, and 3 parts by weight of carbon black as a conductive material were weighed and mixed in an NMP solvent to prepare a second slurry for a second mixture layer.

The first slurry was applied on an aluminum foil and dried, and then subjected to a first rolling operation to form a first mixture layer (average thickness: 8 μm). Subsequently, the second slurry was applied on the first mixture layer and dried, and then subjected to a second rolling operation to form a second mixture layer (average thickness: 100 μm).

In this case, conditions for performing the first and second mixture layer forming operations and the first and second rolling operations are shown in Table 1 below.

trode additive was calculated from the measured XRD. In this case, the XRD was measured using Rigaku's XRD analyzer, a 1.5406 Å wavelength (Cu Kα radiation, 40 kV, 100 mA) was scanned, and an XRD pattern was obtained at 2θ in a range of 15° to 64° and at a scanning speed of 5°/sec.

As a result, in the first mixture layer in each of Examples 1 to 4, a peak appearing in $Li_6CoO_4$ was observed. Specifically, a peak having intensity A was observed in a range of 2θ=38.5±0.1°, and a peak having intensity B was observed in a range of 2θ=47.9±0.1°. For reference, A/B in each of Examples 1 to 4 was 0.1 or less.

On the other hand, in each of Comparative Examples 1 to 4, a peak as appearing in Examples 1 to 4 was not observed. It seems that a structure of the positive electrode additive is deformed due to a high temperature in the mixture layer forming operation and the rolling operation when the positive electrode is manufactured.

Experimental Example 2

In order to evaluate performance of the positive electrode for a lithium secondary battery according to the present disclosure, experiments were performed as described below.
1) Initial Resistance Value Evaluation A lithium secondary battery was manufactured using each of the positive electrodes manufactured in Examples 1 to 4 and Comparative Examples 1 to 7. Specifically, natural graphite as a negative electrode active material, a carbon black conductive material, and a PVdF binder were mixed in an NMP solvent at a weight ratio of 85:10:5 to prepare a slurry for forming a negative electrode, and the slurry for forming a negative electrode was applied on a copper foil to

TABLE 1

|  | First mixture layer forming operation | First rolling operation | | | Second mixture layer forming operation | Second rolling operation | | |
| --- | --- | --- | --- | --- | --- | --- | --- | --- |
|  | First slurry temperature[° C.] | Temperature [° C.] | Pressure [MPa] | Speed [m/s] | Second slurry temperature[° C.] | Temperature [° C.] | Pressure [MPa] | Speed [m/s] |
| Example 1 | 30 ± 1 | 25 ± 1 | 100 | 1 | 30 ± 1 | 70 ± 1 | 100 | 3 |
| Example 2 | 30 ± 1 | 25 ± 1 | 100 | 1 | 30 ± 1 | 50 ± 1 | 100 | 3 |
| Example 3 | 30 ± 1 | 25 ± 1 | 100 | 1 | 30 ± 1 | 70 ± 1 | 50 | 3 |
| Example 4 | 30 ± 1 | 25 ± 1 | 100 | 4 | 30 ± 1 | 70 ± 1 | 100 | 4 |
| Comparative Example 1 | 30 ± 1 | 25 ± 1 | 100 | 1 | 60 ± 1 | 25 ± 1 | 100 | 3 |
| Comparative Example 2 | 60 ± 1 | 25 ± 1 | 100 | 1 | 60 ± 1 | 25 ± 1 | 100 | 1 |
| Comparative Example 3 | 30 ± 1 | 25 ± 1 | 50 | 1 | 60 ± 1 | 70 ± 1 | 100 | 3 |
| Comparative Example 4 | 30 ± 1 | 60 ± 1 | 100 | 1 | 30 ± 1 | 70 ± 1 | 100 | 3 |
| Comparative Example 5 | 30 ± 1 | 25 ± 1 | 200 | 1 | 30 ± 1 | 70 ± 1 | 100 | 3 |
| Comparative Example 6 | 30 ± 1 | 25 ± 1 | 100 | 0.3 | 30 ± 1 | 70 ± 1 | 100 | 3 |
| Comparative Example 7 | 30 ± 1 | 25 ± 1 | 100 | 7 | 30 ± 1 | 70 ± 1 | 100 | 3 |

Experimental Example 1

1) Observation of XRD Pattern of First Mixture Layer

In order to confirm a change of a positive electrode additive due to temperature when a positive electrode for a lithium secondary battery is manufactured, XRD was measured for the first mixture layer of the positive electrode for a lithium secondary battery prepared in each of Examples 1 to 4 and Comparative Examples 1 to 4, and a fraction of the lithium cobalt metal oxide included in each positive elecmanufacture a negative electrode. A separator (thickness: about 16 μm) made of a porous polyethylene (PE) film was laminated to be interposed between each positive electrode manufactured in Examples 1 to 4 and Comparative Examples 1 to 7 and the negative electrode manufactured above to manufacture an electrode assembly. After the manufactured electrode assembly was placed inside a battery case, an electrolyte was injected into the case to manufacture a lithium secondary battery. In this case, an electrolyte was prepared by dissolving lithium hexafluorophosphate (LiPF$_6$) at a concentration of 1.0 M in an organic solvent consisting of ethylene carbonate/dimethyl carbonate/ethyl methyl carbonate (the mixing volume of EC/DMC/EMC is 3/4/3).

Then, each lithium secondary battery manufactured above was charged with a constant current (CC) so that a voltage of the battery became 4.2 V at a current of 333 mA at a rate of 0.3 C in a constant current-constant voltage (CC-CV) method, and each lithium secondary battery was charged once by cutting off at a current of 0.05 C while maintaining a constant voltage (CV) of 4.2 V after the voltage of the battery reached 4.2 V. One cycle of performing constant current (CC) discharge at a constant current of 333 mA at a rate of 0.3 C for the first charged battery until the voltage of the battery reached 3 V was repeated three times, the voltage drop that occurs when discharging for 10 seconds with a current of 2 A (2C) was recorded, and then direct current (DC) discharge resistance values measured during the initial evaluation calculated using R=V/I (Ohm's Law) are shown in Table 2 below. In this case, the DC resistance has a close relationship with output characteristics of the secondary battery.

2) Cycle Life Performance Evaluation

In the same manner as in the evaluation of the initial resistance value, a lithium secondary battery was manufactured using the positive electrode manufactured in each of Examples 1 to 4 and Comparative Examples 1 to 7. For each manufactured lithium secondary battery, a capacity retention rate was measured while 100 times of charging and discharging (n=100) and 200 times of charging and discharging (n=200) at a temperature of 25° C. were performed under conditions of a final charge voltage of 4.25 V, a final discharge voltage of 2.5 V, and 0.5 C/0.5 C. In this case, the capacity retention rate was calculated using Expression 2 below, and results of the calculation are shown in Table 2 below:

Capacity retention rate (%)=(discharge capacity at n times of charging/discharging/discharge capacity at one time of charging/discharging)×100    [Expression 2]

TABLE 2

| | Resistance (mΩ) | Capacity retention rate during charging and discharging | |
|---|---|---|---|
| | | 100 times (n = 100) | 200 times (n = 200) |
| Example 1 | 64.8 | 98.1 | 94.9 |
| Example 2 | 63 | 98.5 | 95.6 |
| Example 3 | 63.9 | 96.9 | 94.7 |
| Example 4 | 61.2 | 98.7 | 95.7 |
| Comparative Example 1 | 82.8 | 96.6 | 91.7 |
| Comparative Example 2 | 79.2 | 92 | 81.1 |
| Comparative Example 3 | 82.8 | 90.8 | 84.4 |
| Comparative Example 4 | 84.6 | 95.6 | 88.9 |
| Comparative Example 5 | 86.4 | 94.4 | 90.2 |
| Comparative Example 6 | 74.7 | 94.4 | 90.1 |
| Comparative Example 7 | 72 | 92 | 88.1 |

As shown in Table 2, it was confirmed that the lithium secondary battery manufactured in each of Examples 1 to 4 has a resistance value lower than that in each of Comparative Examples 1 to 7. In particular, the lithium secondary batteries including the positive electrodes of Comparative Examples 1 to 4 had the highest resistance value. This is considered to be due to structural deformation of the positive electrode additive due to high temperature in the mixture layer forming operation and rolling operation when the positive electrode is manufactured. Furthermore, it was found that the batteries having the positive electrodes of Examples have improved electrical performance and have high capacity retention rates of 97% or more and 95% or more, respectively, when charging and discharging 100 times and 200 times. On the other hand, it was confirmed that, in Comparative Example 5, the porosity of the first mixture layer was too small to penetrate the electrolyte to the surface of the current collector, and thus the electrical performance of the battery was lowered. Furthermore, it was confirmed that, in the batteries including the positive electrodes of Comparative Example 6 and 7, the porosity of the first mixture layer was significantly reduced, and thus the electrical performance of the battery was lowered.

From the above results, it was confirmed that, in the positive electrode for a lithium secondary battery according to the present disclosure, the first mixture layer and the second mixture layer are provided on the current collector, the coating temperature of the slurry is adjusted when the positive electrode is manufactured and the rolling of the first mixture layer is performed under specific conditions before the second mixture layer is formed, and thus it is possible to minimize the deformation of the positive electrode additive included in the first mixture layer, and accordingly, it is possible to realize high battery performance.

While exemplary embodiments of the present invention and their advantages have been described above in detail, it should be understood by those skilled in the art that various changes, substitutions and alterations may be made herein without departing from the scope of the invention as defined by the following claims.

Therefore, the technical scope of the present invention should not be limited to the contents described in the detailed description of the specification, but should be defined by the appended claims.

The invention claimed is:

1. A method of manufacturing a positive electrode for a lithium secondary battery, the method comprising:
   applying a first slurry containing a positive electrode active material, a positive electrode additive, a conductive material, and a binder on at least one surface of a current collector and forming a first mixture layer; and
   applying a second slurry containing a positive electrode active material, a conductive material, and a binder on the current collector on which the first mixture layer is formed and forming a second mixture layer,
   wherein the forming of the first mixture layer and the forming of the second mixture layer include a process of controlling a temperature of the first slurry to 40° C. or less and a process of controlling a temperature of the second slurry to 40° C. or less, respectively, and
   wherein Expression 1 below is satisfied when X-ray diffraction (XRD) analysis is performed on the first mixture layer:

$A/B \leq 1$   [Expression 1]

wherein A represents an intensity of a strongest peak among peaks appearing in a range of 2θ=38.5±0.1°, and B represents an intensity of a strongest peak among peaks appearing in a range of 2θ=47.9±0.1°.

2. The method of claim 1, wherein the forming of the first mixture layer and the forming of the second mixture layer include a process of controlling a temperature of the first slurry to be in a range of 10° C. to 40° C. and a process of controlling a temperature of the second slurry to be in a range of 10° C. to 40° C., respectively.

3. The method of claim 1, further comprising:
a first rolling operation of rolling the first mixture layer after the forming of the first mixture layer; and
a second rolling operation of rolling the second mixture layer after the forming of the second mixture layer.

4. The method of claim 3, wherein:
the first rolling operation is performed at a speed of 0.5 m/s to 6 m/s;
the second rolling operation is performed at a speed of 2 m/s to 7 m/s; and
the second rolling operation is performed at a greater speed than the first rolling operation.

5. The method of claim 3, wherein:
the first rolling operation is performed at a temperature of 10° C. to 40° C.; and
the second rolling operation is performed at a temperature of 40° C. to 100° C.

6. A positive electrode for a lithium secondary battery, comprising a current collector and a mixture layer formed on at least one surface of the current collector,
wherein the mixture layer has a two-layer structure in which a first mixture layer and a second mixture layer are laminated,
wherein the first mixture layer includes a positive electrode active material, a positive electrode additive, a conductive material, and a binder, and
wherein Expression 1 below is satisfied when X-ray diffraction (XRD) analysis is performed on the first mixture layer:

$A/B \leq 1$     [Expression 1]

wherein A represents an intensity of a strongest peak among peaks appearing in a range of $2\theta=38.5\pm0.1°$, and B represents an intensity of a strongest peak among peaks appearing in a range of $2\theta=47.9\pm0.1°$.

7. The positive electrode of claim 6, wherein the positive electrode additive is a lithium cobalt oxide represented by Chemical Formula 1 below:

$Li_p Co_{(1-q)} M^1_q O_4$     [Chemical Formula 1]

wherein in Chemical Formula 1 above, $M^1$ denotes one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and p and q are $5 \leq p \leq 7$ and $0 \leq q \leq 0.5$, respectively.

8. The positive electrode of claim 7, wherein the positive electrode additive has a tetragonal structure with a space group of $P4_2/nmc$.

9. The positive electrode of claim 6, wherein a content of the positive electrode additive ranges from 0.1 to 5 wt % with respect to a total weight of the first mixture layer.

10. The positive electrode of claim 6, wherein the positive electrode active material is a lithium nickel composite oxide represented by Chemical Formula 2 below:

$Li_x[Ni_y Co_z Mn_w M^2_v]O_u$     [Chemical Formula 2]

wherein in Chemical Formula 2 above, $M^2$ denotes one or more elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo, and x, y, z, w, v, and u are $1.0 \leq x \leq 1.30$, $0.1 \leq y < 0.95$, $0.01 < z \leq 0.5$, $0.01 < w \leq 0.5$, $0 \leq v \leq 0.2$, $1.5 \leq u \leq 4.5$, respectively.

11. The positive electrode of claim 6, wherein:
an average thickness (D1) of the first mixture layer ranges from 0.1 μm to 20 μm; and
an average thickness (D2) of the second mixture layer ranges from 50 μm to 300 μm.

12. A lithium secondary battery comprising:
the positive electrode according to claim 6;
a negative electrode; and
a separator interposed between the positive electrode and the negative electrode.

13. The lithium secondary battery of claim 12, wherein the negative electrode comprises a negative electrode current collector, and a negative electrode mixture layer positioned on the negative electrode current collector comprising a negative electrode active material,
wherein the negative electrode active material comprises a carbon material and a silicon material.

14. The lithium secondary battery of claim 13, wherein the silicon material is included in an amount of 1 to 20 parts by weight with respect to 100 parts by weight of the negative electrode mixture layer.

* * * * *